Figure 1:
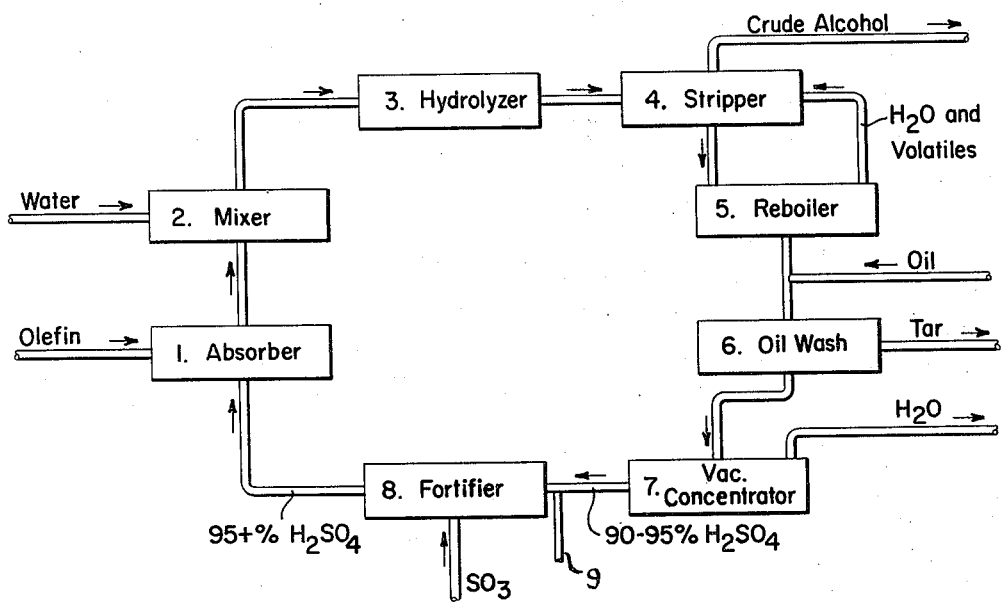

Jan. 14, 1958     S. W. WILSON     2,819,948

METHOD OF FORTIFYING SULFURIC ACID

Filed Jan. 4, 1954

INVENTOR
Samuel W. Wilson
BY Henry Berl
ATTORNEY

United States Patent Office 2,819,948
Patented Jan. 14, 1958

2,819,948

METHOD OF FORTIFYING SULFURIC ACID

Samuel W. Wilson, Baton Rouge, La., assignor to Esso Research and Engineering Company, a corporation of Delaware Application January 4, 1954, Serial No. 402,009

2 Claims. (Cl. 23—172)

This invention relates to an improved method of fortifying with sulfur trioxide a reconcentrated sulfuric acid containing dispersed carbonaceous material by incorporating into the reconcentrated sulfuric acid a small but effective amount of a hydrocarbon oil-soluble sulfonated hydrocarbon.

The fortified acids are used in extracting olefins, such as ethylene, propylene, butylene and amylene, as in the production of alcohols in the selective absorption of the olefins or polymerization of such olefins. In any of these processes, the sulfuric acid being a strong oxidizing agent, tends to form a number of carbonaceous compounds which remain in the acid, after the main products are separated therefrom. Consequently, there are problems of removing carbonaceous contaminants from the acids so that the acids can be reconcentrated and fortified for reuse.

A substantial amount of the carbonaceous impurities in the spent sulfuric acid are separated therefrom by diluting the acid to coagulate or precipitate out the organic material which is less soluble in the dilute acid. The thus separated organic material may be filtered out or may be washed out with a hydrocarbon oil or similar organic liquid which is inert to and does not dissolve in the dilute sulfuric acid. Nevertheless, a substantial amount of carbonaceous material which cannot be filtered out or removed from the acid otherwise economically tends to remain dispersed in the sulfuric acid when it is being reconcentrated and thereafter fortified. These acids are characterized by a dark gray to black color.

It has now been found that, in general, the dispersed carbonaceous materials in the concentrated sulfuric acid, have adverse effects on the rate of absorbing the sulfur trioxide, but these adverse effects are overcome by having incorporated in the concentrated acid the oil-soluble sulfonated hydrocarbon agents.

By oil-soluble sulfonated hydrocarbon agents it is intended to denote such substances as alkyl aryl sulfonic acids and petroleum sulfonic acids having average molecular weights of the order of 400 or higher. These materials may be incorporated in various ways, such as by addition of the sulfonic acids per se, of alkali metal salts of the sulfonic acids which hydrolyze to give the free sulfonic acids, or by addition of the kinds of hydrocarbons which react with the sulfuric acid to form the suitable oil soluble sulfonic acids.

An example of these kinds of processes in which fortification of the sulfuric acid prior to extraction of an olefin, e. g. ethylene, becomes of interest, is described in U. S. Patents 2,474,568 and 2,474,569 of Bannon et al. It will be noted that in such processes a fortified sulfuric acid usually of 95% or higher strength is used to absorb the olefin, e. g., ethylene, followed by hydrolysis through dilution with water, stripping out the alcohol and ether product, partial concentration of the resulting spent acid to above 65–70% strength, removal of carbonaceous material, then reconcentrating of the spent (black) acid under vacuum to about 85–93% strength before it is fortified in a subsequent absorption of $SO_3$.

Regardless of the source of the reconcentrated sulfuric acid to be fortified, the adverse effects of the highly dispersed carbonaceous materials which are not eliminated therefrom by dilution and filtration or oil washing can be overcome by incorporating into the acid effective amounts of the oil soluble-sulfonic acids. Such amounts are of the order of .01 to 0.5 volume percent of the sulfuric acid.

Some important considerations in using the oil-soluble sulfonic acids for the purpose set forth is that these agents must be sufficiently stable to remain effective even though they are subjected to this strong oxidizing agent; they must not have a deleterious effect when left in the sulfuric acid to be used in extracting the olefins.

Experimental observations substantiate that the oil-soluble sulfonic acids present in fortifying the sulfuric acid are capable of increasing the capacity in the fortification absorption zone and remain in the fortified sulfuric acid to even enhance the consequent olefin absorption.

The following experiments which demonstrate the invention will be described with reference to the accompanying drawing.

In Figure 1 of the drawing is illustrated schematically a flow plan for the strong acid extraction of ethylene in the manufacture of ethanol.

Figure 2:
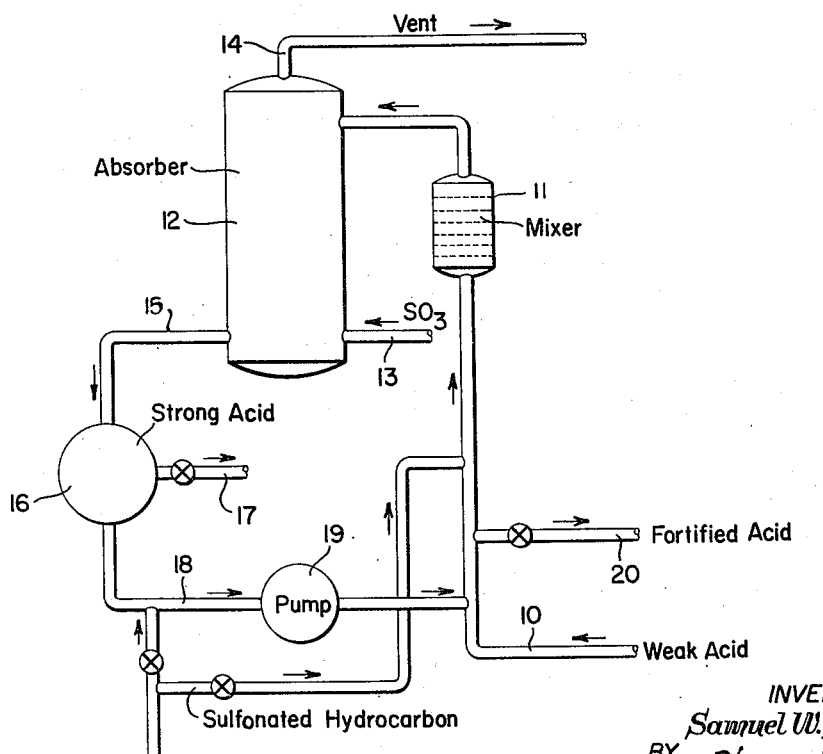

Figure 2 shows a flow plan for a preferred commercial method of introducing an oil-soluble sulfonate for improving the fortification of spent sulfuric acid.

Referring to Figure 1, the fortified acid of 95–99% strength is supplied to the absorber 1 for extracting ethylene. The acid extract is diluted with added water in mixer 2. The diluted extract is hydrolyzed from the hydrolysis zone 3. The hydrolyzed extract is subjected to the steam stripping 4 to distill over a crude ethanol and volatile impurities such as ether. The stripped dilute or spent sulfuric acid is subjected to atmospheric reboiling 5 to recover volatile impurities and increase the concentration of the spent acid in the range of about 40 to 60%. At this point the partially reconcentrated acid will contain about 0.5% carbon and carbonaceous impurities. The partially reconcentrated acid is washed with oil to remove as much of the carbonaceous impurities as can be removed in an oil washer 6, and thus reducing the carbonaceous materials to some extent by leaving an amount thereof equivalent to about 0.3% carbon. The oil washed acid is then subjected to vacuum reconcentration 7 to have the acid approach 85–93% strength. At this point there will still remain in the acid carbonaceous material giving the acid about 0.2% carbon content or more. The thus reconcentrated acid is then subjected to the acid fortification 8 with the addition of the oil soluble sulfonated hydrocarbon agent as indicated through line 9.

It is to be noted that there must be a replenishing of the oil-soluble sulfonic acid agent in the circuit shown to obtain the benefits thereof during the acid fortification since in the earlier washing step or similar step for removing oil-soluble sludge impurities there will be a removal of the oil-soluble sulfonic acids.

A preferred commercial type of fortification improved by addition of oil-soluble sulfonic acid, as shown in Figure 2, starts with a feed stream 10 of black sulfuric acid as concentrated in an alcohol acid plant, e. g. concentrated to about 85–95% $H_2SO_4$ strength, through feed line 10. This feed of black acid would be fortified as passed through a mixer 11, e. g., an orifice mixer or the like, and is passed into an upper part of an absorber 12. Suitable conditions in the absorber are of the order of 20° C. to 100° C. at about atmospheric (0 p. s. i. g.) pressure. The absorber may be equipped with liquid-contacting means, such as distributing plates, bubble cap plates, etc., to bring about intimate contact of the liquid acid with $SO_3$-bearing gas introduced at a lower part of the absorber from line 13.

The gaseous sulfur trioxide entering the absorber may be at a temperature of the order of 50° to 150° C. Unabsorbed gas or diluent gas is vented from the upper part of the absorber through line 14.

The desired fortified acid, e. g. 95% to 100% strength, is withdrawn from a bottom part of the absorber through line 15 to storage tank 16, whence it may be withdrawn from the system by line 17 for use in any other system of fortification or as the acid to be used in an alcohol manufacture plant. Certain portions of this strong acid from storage tank 16 may be passed by line 18 through pump 19 into the black acid feed line 10 to bring the black acid up to a suitable level for introduction into the absorber 12. By proportioning the strong acid from the absorber with the weak acid the resulting mixture can be brought to a strength which supplies a finished sulfuric acid of required strength for use in an alcohol plant. Thus, a portion of the mixed acid stream can be withdrawn through line 20 as finished for storage, particularly where the mixture is a strength of at least 95%.

A particularly advantageous procedure involves mixing the relatively weak black (of 85 to 95 wt. percent $H_2SO_4$), enough of fortified black acid of relatively high strength (above 99 wt. percent $H_2SO_4$) and with the sulfonic acid or sulfonate which improves the mixture for the subsequent treatment with gaseous $SO_3$. This mixing can be carried out with proportioning of the acids to form a mixture containing 95 to 99 wt. percent $H_2SO_4$ including .01 to .5 vol. percent of the sulfonic acid.

Having described the invention it is claimed as follows:

1. In fortifying a reconcentrated oil-washed spent black sulfuric acid by absorption therein of sulfur trioxide, the spent black acid having been washed with oil to remove oil-soluble carbonaceous material including oil-soluble sulfonated hydrocarbons prior to the reconcentrating, the improvement which comprises admixing with said reconcentrated black sulfuric acid to be fortified a small amount of oil-soluble sulfonated hydrocarbon effective for increasing the rate of absorption of sulfur trioxide by said reconcentrated acid, then absorbing gaseous sulfur trioxide in the resulting mixture of the reconcentrated black acid containing the admixed oil-soluble sulfonated hydrocarbon.

2. In fortifying a relatively weak reconcentrated black acid of 85 to 95 wt. percent $H_2SO_4$ strength, said reconcentrated black acid having been freed of oil-soluble carbonaceous materials which are removed by oil-washing prior to reconcentrating, the improvement which comprises admixing a small amount of an oil-soluble sulfonated hydrocarbon with the reconcentrated black acid which is to be fortified by absorption of gaseous sulfur trioxide to a higher $H_2SO_4$ strength, and absorbing gaseous sulfur trioxide by the resulting mixture of the reconcentrated black acid containing the oil-soluble sulfonated hydrocarbon admixed in an amount for improving the rate of absorption of the sulfur trioxide by the reconcentrated black acid.

References Cited in the file of this patent
UNITED STATES PATENTS

| | | |
|---|---|---|
| 2,022,800 | Brown et al. | Dec. 3, 1935 |
| 2,302,825 | Wilde et al. | Nov. 24, 1942 |
| 2,660,516 | Leyden | Nov. 24, 1953 |